(12) United States Patent
Burbridge et al.

(10) Patent No.: US 9,985,871 B2
(45) Date of Patent: May 29, 2018

(54) OPERATION OF A DATA NETWORK

(71) Applicant: BRITISH TELECOMMUNICATIONS PUBLIC LIMITED COMPANY, London (GB)

(72) Inventors: Trevor Burbridge, London (GB); Andrea Soppera, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 393 days.

(21) Appl. No.: 14/431,483

(22) PCT Filed: Sep. 30, 2013

(86) PCT No.: PCT/GB2013/000412
§ 371 (c)(1),
(2) Date: Mar. 26, 2015

(87) PCT Pub. No.: WO2014/049320
PCT Pub. Date: Apr. 3, 2014

(65) Prior Publication Data
US 2015/0263935 A1 Sep. 17, 2015

(30) Foreign Application Priority Data

Sep. 28, 2012 (EP) .................................... 12250159

(51) Int. Cl.
*G06F 15/173* (2006.01)
*H04L 12/721* (2013.01)
(Continued)

(52) U.S. Cl.
CPC .......... *H04L 45/14* (2013.01); *H04L 41/0893* (2013.01); *H04L 43/10* (2013.01);
(Continued)

(58) Field of Classification Search
CPC ....... G06F 15/173; H04L 12/28; H04L 45/14; H04L 41/0893; H04L 43/028; H04L 43/10; H04L 47/20; H04L 47/31
(Continued)

(56) References Cited

U.S. PATENT DOCUMENTS 7,940,756 B1 * 5/2011 Duffy ..................... H04L 41/50
370/235
8,391,142 B2 * 3/2013 Blasinski .......... H04W 72/1252
370/230
(Continued)

FOREIGN PATENT DOCUMENTS

EP   2 106 068   9/2009

OTHER PUBLICATIONS

International Search Report for PCT/GB2013/000412, dated Jan. 7, 2014, 3 pages.
(Continued)

*Primary Examiner* — Davoud Zand
(74) *Attorney, Agent, or Firm* — Nixon & Vanderhye PC

(57) ABSTRACT

Methods and apparatus are disclosed for operating a data network (10), the data network comprising a plurality of network ingestion points (12, 14) via which data traffic (38) may be received from another data network, and a plurality of network attachment points (16) via which data traffic may be forwarded. The method comprises receiving data traffic (38) via said network ingestion points (12, 14), assigning ingestion point indications indicative of a characteristic of the network ingestion points (12, 14); forwarding the traffic via said network attachment points (16); and in respect of data traffic being forwarded via said network attachment points (16), determining traffic information indicative of a characteristic of the data traffic; and selecting a traffic management policy in dependence on said traffic informa- (Continued)

tion and the characteristic of the network ingestion point via which the data traffic was received.

21 Claims, 3 Drawing Sheets

(51) Int. Cl.
    *H04L 12/813* (2013.01)
    *H04L 12/24* (2006.01)
    *H04L 12/833* (2013.01)
    *H04L 12/26* (2006.01)
(52) U.S. Cl.
    CPC ............ *H04L 47/20* (2013.01); *H04L 43/028* (2013.01); *H04L 47/31* (2013.01)
(58) Field of Classification Search
    USPC .......................................... 709/223; 370/254
    See application file for complete search history.

(56) References Cited

U.S. PATENT DOCUMENTS

| | | | | |
|---|---|---|---|---|
| 2004/0015579 | A1* | 1/2004 | Cooper | H04L 12/2602 709/223 |
| 2006/0059253 | A1* | 3/2006 | Goodman | G06Q 10/10 709/223 |
| 2006/0136570 | A1* | 6/2006 | Pandya | G06F 17/30985 709/217 |
| 2007/0174428 | A1* | 7/2007 | Lev Ran | G06F 9/546 709/218 |
| 2008/0077705 | A1* | 3/2008 | Li | H04L 47/10 709/236 |
| 2011/0182194 | A1* | 7/2011 | Jacquet | H04L 12/2602 370/252 |
| 2012/0089845 | A1* | 4/2012 | Raleigh | H04L 12/14 713/176 |
| 2012/0117610 | A1* | 5/2012 | Pandya | H04L 63/0485 726/1 |
| 2013/0304796 | A1* | 11/2013 | Jackowski | H04L 47/19 709/202 |
| 2014/0280846 | A1* | 9/2014 | Gourlay | H04L 41/00 709/223 |

OTHER PUBLICATIONS

Written Opinion of the International Searching Authority for PCT/GB2013/000412, dated Jan. 7, 2014, 5 pages.
Search Report for EP 12250159, dated Feb. 20, 2013, 4 pages.
International Preliminary Report on Patentability for PCT/GB2013/000412, dated Dec. 12, 2014, 5 pages.

* cited by examiner

OPERATION OF A DATA NETWORK

This application is the U.S. national phase of International Application No. PCT/GB2013/000412, filed 30 Sep. 2013, which designated the U.S. and claims priority to EP Patent Application No. 12250159.6, filed 28 Sep. 2012, the entire contents of each of which are hereby incorporated by reference.

TECHNICAL FIELD

The present invention relates to methods of and apparatus for operating a data network, the data network comprising a plurality of network ingestion points via which data traffic may be received from another data network, and a plurality of network attachment points via which data traffic may be forwarded.

BACKGROUND TO THE INVENTION AND PRIOR ART

Broadband subscribers and other business customers of Internet Service Providers (ISPs) use a wide variety of applications and services. Some of the traffic that ISPs carry will have originated from inside the ISP network, for example from other subscribers of the same ISP or from ISP-owned services such as Internet Protocol Television (IP TV). Other traffic will have originated in the Internet and may arrive at the ISP via one of a number of "transit" and "peering" interfaces. Traditionally, the term "transit" is used to describe a network operator that does not have its own subscribers (and therefore generally requires payment to send or receive traffic) whereas the term "peering" refers to similar network providers sharing traffic in a bilateral arrangement for delivery within their own network.

The amount of traffic arriving over such transit and peering interfaces is closely monitored, either to check compliance with a policy or to calculate charges. Such arrangements are usually based on the peak rate sent over the interface (although average rate, volume or other measures may be used). For "transit" traffic, for example, there is generally a charge to be levied based on the peak rate at which the traffic arrives. The traffic on a transit interface may be monitored in 5 minute intervals, with the 95th percentile interval being used to indicate the rate to be used for charging.

For traffic carried under a "peering" arrangement, the monitoring, which may involve a similar or different measure being taken, may simply be used by one ISP to ensure that it isn't carrying significantly more (e.g. by a factor of three) of another ISP's traffic than that ISP is carrying of the first ISP's traffic.

In recent years the distinction between transit and peering has become confused. Most internet traffic is now originated at large service providers and CDNs (Content Delivery Networks). Some organisations, such as Level3 Networks are both transit providers and CDN operators. A network provider that had been operating under peering arrangements may find that a peering partner has become a content provider who might be expected to pay for its traffic to be carried, but who is (ab)using a peering arrangement for its traffic.

A recent example of this is the well-cited dispute between Comcast and Level3. Originally Netflix had contracted Akamai (a CDN) to deliver their traffic. Netflix paid Akamai who in turn paid Comcast. Netflix then moved to Level3 who were also a transit provider for Comcast. Netflix paid Level3, but Comcast then found themselves in the position of not receiving any payment for the Netflix traffic they were carrying, which was now coming from Level3. Level3 also receive transit payments from other ISPs who do not have as much bargaining power as Comcast for the same Netflix traffic. Comcast decided that Level3 were no longer acting as a transit provider and decided to start charging Level3.

Another defence that an ISP may attempt (in order to deter traffic from appearing over paid-for transit arrangements) is to operate transit interfaces at very high utilisations. This constrains the amount they pay to the transit provider and also encourages content providers and CDNs to negotiate direct peering arrangements with the ISP. The downside of such an approach is that it may also indiscriminately degrade the experience of the ISP's own subscribers.

While ISPs generally monitor what is going over their transit and peering interfaces (for example by observing the source and destination IP addresses and who owns them), many ISPs also use Deep Packet Inspection (DPI) to analyse and control the traffic passing through their networks.

The siting of any DPI system depends on the role it is intended to fulfil. Some ISPs site their DPI systems as close to the transit and peering points as possible. In this manner they can apply general policies to Internet traffic, but can also apply specific policies to an individual transit or peering arrangement. For example, peer-to-peer (P2P) traffic may be more heavily throttled on an expensive transit connection than on a free peering connection. By siting the DPI close to the ingress of the Internet traffic, however, the ISP loses the ability to analyse and control subscriber traffic that is turned around (e.g. subscriber to subscriber) or which has originated in the ISP's network (e.g. IP TV). Typically, tight control of an individual subscriber line (such as prioritising and shaping the traffic to fit into the subscriber line bandwidth) is not possible.

The above approach is shown in FIG. 1, which illustrates a scenario in which traffic policies are applied at ingestion points to manage transit/peering arrangements and costs. In FIG. 1, traffic arrives at an ISP network 10 either via one of a plurality of peering points 12 or via one of a plurality of transit points 14. Policy points 15 are located at some (or possibly all) of the peering points 12 and transit points 14, and may apply policies to the traffic they "see". Unless blocked or redirected, the traffic 18 is then forwarded across the ISP network 10 and on towards its destination via one of a number of broadband subscriber access points (or "attachment points") 16.

An alternative, pursued by many other ISPs is to site the DPI systems close to the subscriber lines themselves, for example co-located with the Broadband Remote Access Server (BRAS) where the broadband line is terminated. At this location the DPI system can inspect 100% of the user traffic and can be used to prioritise traffic and improve user experience (for example by prioritising voice and video traffic over file downloads). It can also be used to restrict the user line speed to offer reduced speed broadband products or apply security controls such as parental control and content filtering. However, siting the DPI system close to the subscriber (or indeed at any point deeper in the network than the transit and peering interfaces) means that traffic arriving over different transit and peering interfaces cannot be distinguished by the DPI system or in any subsequent analysis.

This alternative approach is shown in FIG. 2, which illustrates a scenario in which traffic policies are applied near subscribers to control subscriber experience and product. In FIG. 2, traffic again arrives at an ISP network 10 either via one of a plurality of peering points 12 or via one of a plurality of transit points 14. The traffic 18 is forwarded across the ISP network 10 and on towards one of a number of broadband subscriber access points (or "attachment points") 16, but at some or all of these, policy points 25 are located which may apply policies to the traffic they "see", which may result in sanctions or other actions being applied in respect of the traffic forwarded (or intended to be forwarded) to the respective (intended) destinations via the respective broadband subscriber access points 16.

It would be possible to implement more complex policies by running DPI or other accounting and/or control systems at multiple points in the network, each with separate policies (that apply specifically to either network transit/peering arrangements or subscriber policies). This approach would however be complex, and would be likely to be costly. It may also limit the types of policies that can be applied (e.g. it may not be possible to ensure that each user has a fair share of bandwidth if the traffic has already been pre-shaped at the transit/peering points). Putting traffic through multiple stages of enforcement can also have a negative impact on the Quality-of-Service (QoS) that a subscriber receives, by introducing network delays, for example.

European application EP2106068 discloses a technique for determining origin-specific network metrics in respect of a data network having at least one ingress node. Data items received from the network are forwarded with headers comprising fields for carrying origin information relating to the origin of the data item, and path metric information indicative of a characteristic being monitored. The data items are caused to traverse the network, and as they are doing so, the fields carrying path metric information are updated. After the data items have traversed the network, the origin information and path metric information are determined, and an origin-specific path metric relating to the characteristic in respect of the relevant portion of a path across the network is derived in dependence thereon. An origin-specific network metric is then determined by combining origin-specific path metrics derived in respect of different data items if they relate to characteristics in respect of data items having a common origin.

SUMMARY OF THE INVENTION

According to a first aspect of the present invention, there is provided a method of operating a data network, the data network comprising a plurality of network ingestion points via which data traffic may be received from another data network, and a plurality of network attachment points via which data traffic may be forwarded, the method comprising:
 receiving data traffic via at least one of said network ingestion points; and
 forwarding data traffic from said at least one network ingestion point via at least one of said network attachment points; the method further comprising:
in respect of at least one of said network ingestion points via which data traffic is received:
 assigning an ingestion point indication indicative of a characteristic of said network ingestion point in respect of said data traffic received via said network ingestion point; and
in respect of data traffic being forwarded via at least one of said network attachment points:
 determining traffic information indicative of a characteristic of the data traffic; and
 selecting a traffic management policy in dependence on said traffic information and in dependence on an ingestion point indication assigned in respect of said data traffic indicative of the characteristic of the network ingestion point via which the data traffic was received;

The data network is preferably a digital communications network such as packet network, and is preferably a network that forms a part of an internetwork.

It will be understood that the "other data networks" from which data traffic may be received may be the networks of (other) ISPs, content providers, transit providers or other such service providers, but alternatively, they may simply be networks of individual users (home or business subscribers of an ISP, for example).

Similarly, while the entities to which the data is being forwarded (or intended to be forwarded) may simply be individual users (home or business subscribers, for example), they may be the networks of (other) ISPs, content providers, transit providers or other such service providers.

According to preferred embodiments, the assigning step may comprises assigning one or more indications to data items of which the data traffic is comprised (by updating header fields in packets or other such data items, or otherwise marking them, for example).

According to preferred embodiments, the characteristic of the network ingestion point may be a characteristic selected from the following:
 the identity of the network ingestion point;
 the location in the network of the network ingestion point;
 a categorisation or type of the network ingestion point (the categorisation or defining of types being done by, on behalf of, or under the control of the entity operating the network);
 the identity of another network, or of a sender, from which data traffic is received via said network ingestion point;
 a categorisation or type of other network, or of sender, from which data traffic is received via said network ingestion point.

According to preferred embodiments, the determining step may be performed at a node remote from the network ingestion point via which the data traffic was received.

According to preferred embodiments, the determining step is performed at or near the network attachment point via which the data traffic is being forwarded.

The determining step may comprise determining traffic information indicative of a characteristic of the data traffic directly from the data traffic. The determining step may comprise inspecting individual data items (e.g. TCP/IP packets, or other such data units) of which the data traffic is comprised. The determining step may comprise inspection of data at a plurality of levels in the OSI stack. In particular, the determining step may comprise performing Deep Packet Inspection, for example. This may involve inspection of data at a plurality of levels in the OSI stack, in particular at levels 5-7, which may not otherwise be inspected by a routing node.

Alternatively or additionally, the determining step may comprise determining traffic information indicative of a characteristic of the data traffic indirectly from the data traffic. In such cases, the determining step may involve determining additional traffic information from elsewhere and/or from historical data for example, in dependence on information obtained directly from the data traffic itself.

The characteristic of the data traffic of which the determined traffic information is indicative may relate to the sender, the (intended) receiver, a type or categorisation of the data traffic, or any of a variety of others which will be discussed later. It may also relate to a combination of more than one of these.

The traffic management policy may be selected in dependence also on factors other than traffic information and ingestion point indication, such as time or date characteristics, network topology and status information, for example.

According to preferred embodiments, the method may further comprise a step of applying the selected traffic management policy in respect of data traffic being forwarded via the network attachment point in question. Preferably, such an applying step is performed at one or more nodes remote from the network ingestion point via which the data traffic was received. Further, such an applying step is preferably performed at one or more nodes remote from nodes at which the assigning of ingestion point indications has been performed.

Such an applying step may be performed at the network attachment point via which the data traffic is being forwarded, or at a node remote from the network attachment point via which the data traffic is being forwarded.

The step of applying the selected traffic management policy may comprise applying "in-band" sanctions to the data traffic, examples of which include:
  prioritising or de-prioritising forwarding of the data traffic (relative to other data traffic);
  dropping, blocking, delaying or re-directing the data traffic;
  modifying data items of which the data traffic is comprised (the header and/or payload of IP packets, for example);
  adjusting or limiting the rate at which data traffic is forwarded via the network attachment point.

Alternatively or additionally, the step of applying the selected traffic management policy may comprise applying "out-of-band" sanctions in respect of the data traffic, examples of which include:
  issuing an alert in respect of the data traffic;
  updating a register in respect of the data traffic, to enable sanctioning actions such as accounting or charging to be applied (possibly later) in respect thereof, for example.

According to a second aspect of the present invention, there is provided apparatus for operating a data network, the data network comprising a plurality of network ingestion points via which data traffic may be received from another data network, and a plurality of network attachment points via which data traffic may be forwarded, the apparatus comprising:
  data traffic routing processors operable to receive data traffic via at least one of said network ingestion points, and to forward data traffic from said at least one network ingestion point via at least one of said network attachment points; the apparatus further comprising:
  a plurality of data traffic marking processors, each operable in respect of at least one of said network ingestion points via which data traffic is received to assign ingestion point indications indicative of one or more characteristics of said network ingestion point in respect of data traffic received via said at least one network ingestion point; and
  one or more policy implementation processors, each operable in respect of data traffic being forwarded via at least one of said network attachment points to perform steps of:
    determining traffic information indicative of a characteristic of the data traffic; and
    selecting a traffic management policy in dependence on said traffic information and in dependence on an ingestion point indication assigned in respect of said data traffic indicative of the characteristic of the network ingestion point via which the data traffic was received.

The various options and preferred embodiments referred to above in relation to the first aspect are also applicable in relation to the second aspect.

According to preferred embodiments of either aspect, the ingestion point of traffic into a network (such as that owned by, run by or under the control of a single ISP, and bounded by the ingestion points and attachment points to that network, which themselves may be owned by, run by or under the control of that ISP) is marked so that subsequent traffic analysis and policy enforcement can be applied elsewhere using policies that holistically manage the traffic at a single location. The traffic may be marked using a choice of (or variety of) standard networking technologies (such as the standard IP networking technologies that are used in relation to an IP network), allowing the marking to be performed by standard network equipment (e.g. an IP router).

Such marking allows a network operator to run a single centralised analysis and policy enforcement capability where decisions can be made over (i.e. in dependence on) the ingestion route (or ingestion point) and the subscriber characteristics, along with more general constraints on the type of traffic being routed (e.g. Peer-to-Peer, Video etc.). This approach is shown in FIG. 3, which illustrates a scenario in which single point policy enforcement over both ingestion point and full subscriber traffic information may be performed. FIG. 3 will be discussed in more detail later.

Route marking in itself is of course, known (there is a "record route" IP option specifically for this requirement in the Internet Protocol), and a variety of other mechanisms exist for marking traffic that can be overloaded/abused for a similar purpose. Traffic can also be marked at network layers higher than IP (e.g. in the packet payload) or delivered over restricted connections (either at level 2 of the OSI (Open Systems Interconnection) stack or as an IP tunnel).

Similarly the analysis and enforcement of policies is known. Primarily, DPI is deployed to allow policies to be aware of (i.e. take account of) layer 7 (the application layer) of the OSI network stack. However, other equipment can be used to apply policies at lower layers (e.g. layer 4, the transport layer). For example an IP router is able to apply policies to restrict the bandwidth given to different blocks of IP addresses. IP routers are also able to account for the volume of traffic to/from different IP addresses.

Preferred embodiments of this invention enable single holistic policies to be applied at a single position in the network. This can be at a choke point (where all subscribers at Internet routes come together) or can be as a distributed functionality closer to the subscriber termination (or other network egress points), for example.

Preferred embodiments of this invention may be used to control how traffic arrives through a number of ingestion points into a network (such as an ISP network) in order to control costs, or the quality-of-experience for those receiving the traffic, for example. This can be achieved by applying policies over (i.e. taking account of) a number of different traffic attributes, including where the traffic is ingested into the network along with other attributes such as the traffic type or attributes associated with the traffic destination (such as the broadband subscriber line or account holder), for example.

Such policies can be used to enable types of action such as the following to be taken:
  Actions associated with charging the operators of the networks through which traffic arrives at the ingestion points. Note that an operator (such as a CDN or content provider) could be charged for traffic received via other operators' networks.

Actions associated with modifying the traffic itself, such as shaping or (de-)prioritisation.

As will therefore be understood from the explanation above, in the Internet, ISPs and other Network Operators reciprocally provide connectivity to each other's customers, generally through peering or transit arrangements. A policy arrangement will generally be in place in respect of any ISP interconnection. This policy governs the business relationship between the ISPs, and could include: traffic volumes, traffic types, routes accessible to specific customers, for example.

As an example, ISP A may be in a business relationship with ISP B that establishes how. ISP A reaches customers in ISP B's network. This relationship is normally managed at each point of interconnection between ISP A and ISP B in a distributed and independent fashion. Policies are then enforced in separate fashion at each interconnection point in a manual form.

According to preferred embodiments of the invention, however, the analysis and policy control may be applied at a single location (or single level of network point in a distributed deployment e.g. across multiple BRAS).

Unlike with previous solutions, therefore, the policies used can include attributes which specify how the traffic arrived on the network (i.e. whether it arrived via transit or peering points or from internal servers), for example. Previously, this would generally have necessitated deploying the traffic analysis and enforcement capabilities uniquely within the network path of the particular ingestion point in question, which would then not have a view of other traffic going to the same subscriber or other such destination.

It will thus be understood that preferred embodiments can enable the monitoring, analysis and enforcement involved in an interconnection policy agreement to be distributed across multiple points of interconnect, rather than the policy needing to be established at a specific enforcement point.

Further, they can enable detailed interconnection policies to be defined based on type of traffic, number of hops crossed in the network, direction of traffic, and other factors, rather than being limited to quantities of traffic due to the complexity of implementing policies in multiple distributed points.

Further, they can enable an ISP to implement more specific traffic management policies in respect of a variety of traffic types based on interconnection policy. With prior techniques, implementing traffic management policies in a variety of independent distributed points is generally unscalable.

BRIEF DESCRIPTION OF THE DRAWINGS

A preferred embodiment of the present invention will now be described with reference to the appended drawings, in which.

DESCRIPTION OF PREFERRED
EMBODIMENTS OF THE INVENTION

As indicated above, with prior techniques, enabling an ISP to implement complex and specific traffic management policies in respect of a variety of traffic types based on interconnection policy, or in a variety of independent distributed points, is generally complex, expensive and unscalable.

Using DPI at multiple points in the network is clearly excessive (and expensive) when what is really needed is a technique that enables analysis not only of the type of traffic, but also of where it has come from or via what type of ingestion point it has been received. How to indicate where the traffic has entered the ISP network may depend on the marking capabilities of the edge routers that receive the traffic, and also on the inspection capabilities of the DPI or other traffic analysis or policy enforcement equipment.

Figure 3:
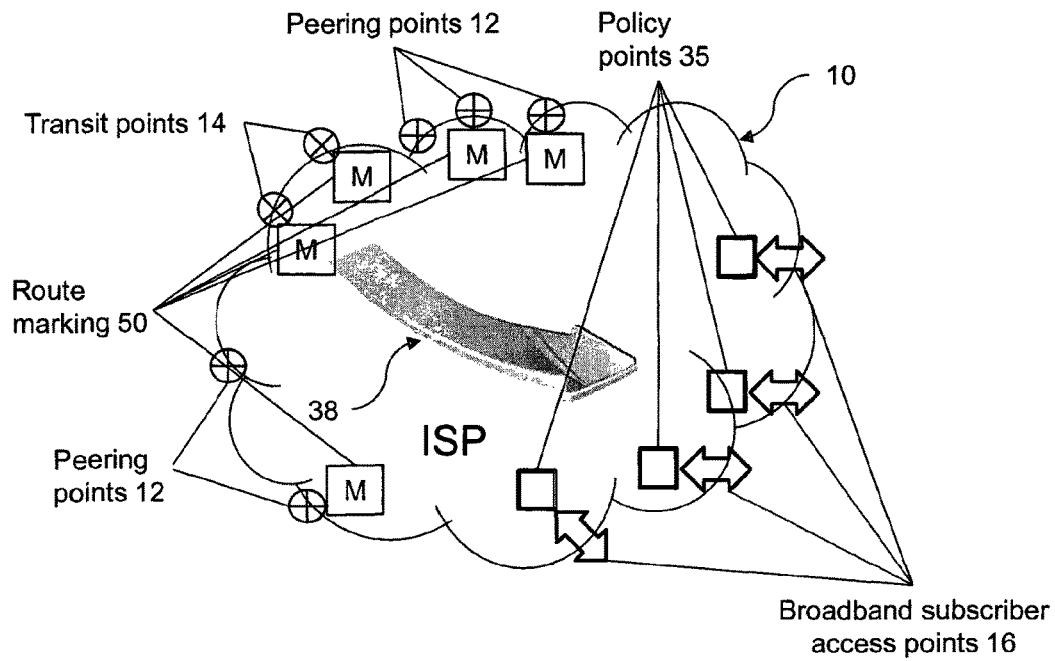
FIG. 3 illustrates a scenario in which single point policy enforcement over both ingestion point and full subscriber traffic information may be performed using an embodiment of the invention.
Figure 4:
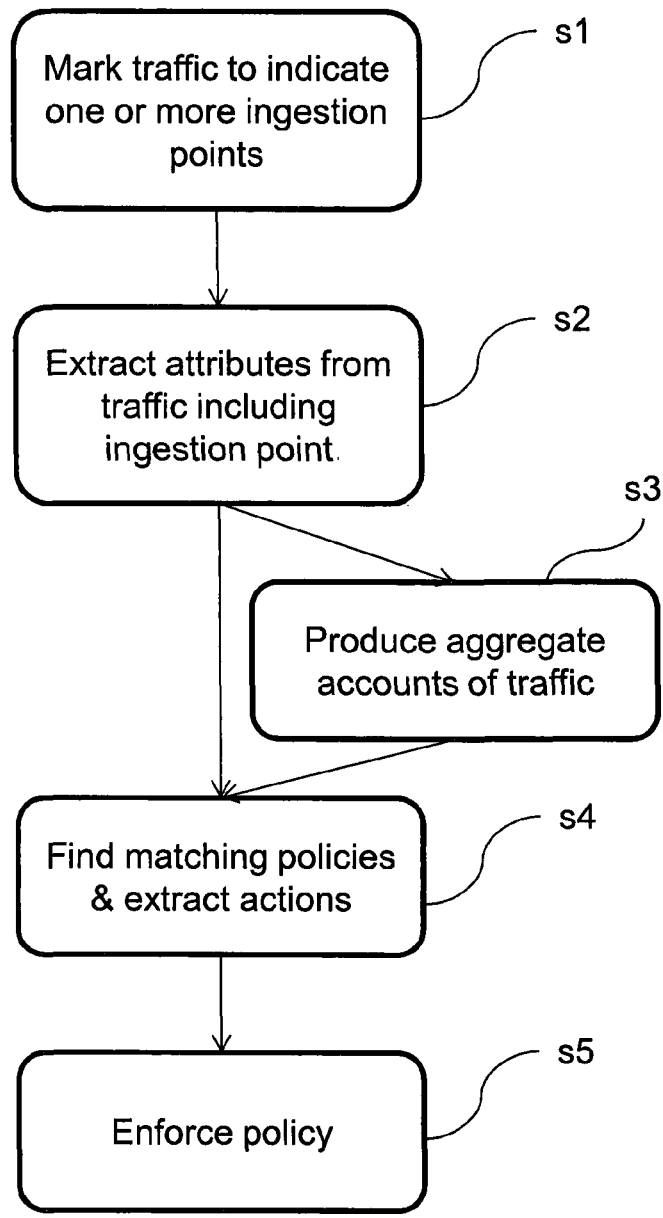
FIG. 4 is a flow-chart illustrating a method according to a preferred embodiment of the invention.

With reference to the accompanying figures, and in particular to FIGS. 3, 4 and 5, a method and associated apparatus according to a preferred embodiment will be described Referring to FIG. 3, traffic arrives at an ISP network 10 either via one of a plurality of peering points 12 or via one of a plurality of transit points 14. At (or topologically near) some or all of these peering points 12 and/or transit points 14, the traffic is marked, by a marker 50, with an indication of a characteristic of the ingestion point via which the traffic has been received. The indication may be of the identity of the peering point 12 or transit point 14 via which the traffic has been received. Alternatively, it may simply be an indication whether that ingestion point is a peering point or a transit point. It may also be an indication of the network with which the ISP 10 exchanges data at the ingestion point in question. other types of indication are also possible, as will be apparent.

The markers 50 may be components of routers at the respective peering and/or transit points, or may be at nodes separate to (but associated with) such routers.

Figure 1:
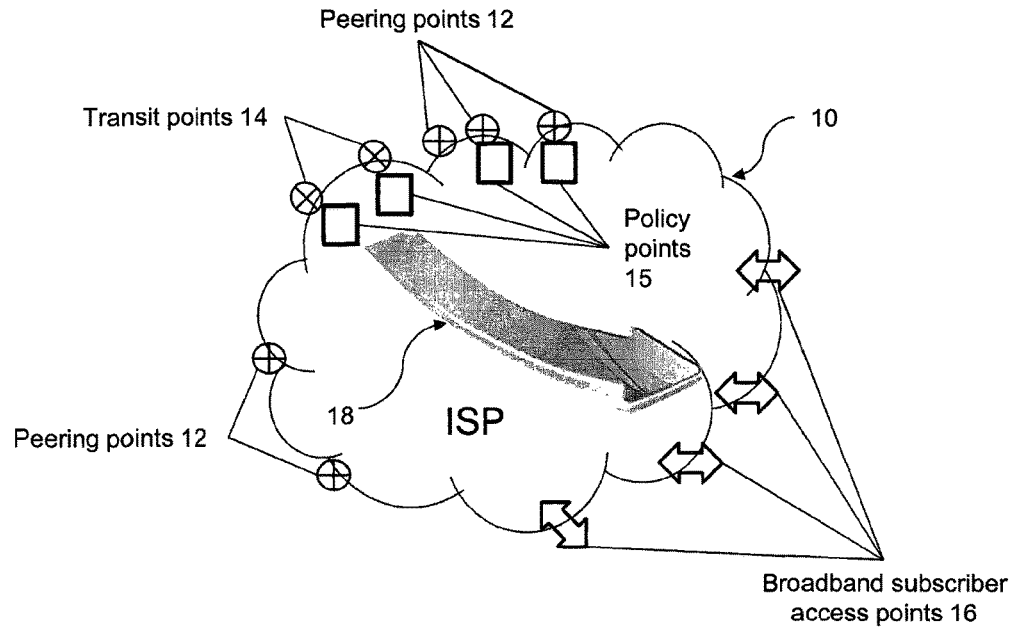
FIG. 1 illustrates a scenario in which traffic policies are applied at ingestion points to manage transit/peering arrangements and costs.
Figure 2:
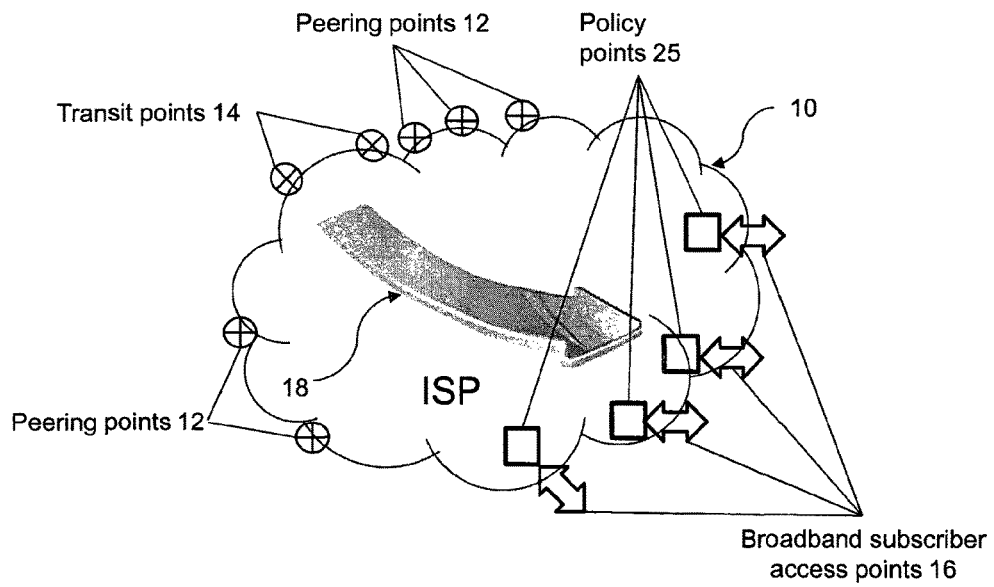
FIG. 2 illustrates a scenario in which traffic policies are applied near subscribers to control subscriber experience and product.

Having been marked, the marked traffic 38 is forwarded across the ISP network 10 and on towards one of a number of broadband subscriber access points 16 or alternative access points such as those for businesses or wireless, all of which may be referred to as "attachment points". At (or otherwise associated with) some or all of these, however, policy points 35 are located which may apply policies to the traffic they "see", which may result in sanctions or other actions being applied in respect of the traffic forwarded (or intended to be forwarded) to the respective (intended) destinations via the respective broadband subscriber access points 16 (or other such attachment points). As will be apparent, the policies implemented at these policy points 35 may take account not just of attributes of the type that may be taken account of at the policy points 25 in FIG. 2, but may also take account of the indications applied to respective items of traffic by the markers 50 at or near the ingestion points.

Some options for indicating how/where the traffic has entered the ISP network include:
1) Tunnelling the traffic from the edge router to the DPI. The source address of the tunnel will indicate the origination point within the ISP network while the original inner packet is still preserved for inspection and onward routing. If different subscribers are to be routed to different parts of the network then multiple tunnels may need to be established from each ingestion point.

2) Setting and using the "record route" IP option. This standard option allows the edge router (and subsequent routers) to record the IP address of the router in the IP packet header.

3) Abusing other IP options such as the "Identification" option (intended to be used for the re-assembling of fragmented packets) or the Differentiated Services Code Point (DSCP) option (that allows a class of service to be specified). Typically, existing DSCP marks are removed by the edge router when the traffic arrives at an ISP network, so these marks can be re-used to indicate an ingestion point instead of a class of service. (DSCP marks would generally need to be "scrubbed" after inspection by the DPI or other analysis/enforcement equipment since they are used for subscriber line delivery.)

Not all ingestion points need to mark traffic—only those for which it is intended to apply a policy. Similarly, multiple ingestion points could share the same mark, if all policies treat that group of ingestion points in the same manner. While this can make writing policies easier (for example using a single mark to denote any "paid-for" connection), in the long-term it may make the evolution to finer-grained policies more difficult (as original marks and policies will need to be revised).

The understanding of where data is ingested into the ISP network allows analysis to be performed over both the route of the traffic as well as over any other characteristic that can be derived (e.g. from layer 2 to layer 7 in the OSI stack using DPI). In this manner the amount of traffic for a certain application that arrives by different routes can be discovered. Actions taken after the analysis can be either directly on the data being analysed or by an alternative process. Actions on the data could include altering the priority of traffic from different ingestion routes or shaping the traffic to a specified limit (on aggregate or per-subscriber, for example). Actions outside of the analysed traffic could include compiling accounts, billing or detection of policy violations, for example.

A policy will typically be written as a "condition", along with an "action" and a "target" to which the action is applied. Often the condition and target will share some attributes—for example if a subscriber has exceeded their usage allowance, then it will generally be the same subscriber that has their traffic shaped, or in respect of whom a billing event is created.

Examples of policies that might be enforced include the following:

1. "Shape total subscriber traffic to line rate X". (This may require knowledge of user line rate and single point visibility of total subscriber traffic.)

2. "Raise an alert if transit provider Y is sourcing traffic from content provider Z". This can be used to detect whether a transit provider is sending traffic which is expected to arrive over another peering interface. (This may require visibility of how the traffic arrived at the ISP network along with layer 7 analysis of the traffic.)

3. "Account for traffic from a transit provider, excluding specific video traffic for which other preferred ingestion arrangements have been made". Such a policy can be used to control transit costs, for example.

4. "Account and charge a content provider or CDN for its traffic regardless of which ingestion arrangement is used for the traffic. If traffic arrives over paid-for transit arrangements then also offset these costs against the CDN/content provider". Such a policy can be used to hold a CDN or content provider liable for the costs they introduce to the ISP network.

5. "Restrict the rate of "Peer-to-Peer" and "File Download" traffic over transit provider Y for subscribers on the 'lowest cost' package". (This may require knowledge of the subscriber identity and package along with where the traffic comes from and layer 7 analysis of the traffic type.)

6. "Ensure that all subscribers receive an equal share of network capacity. Where a subscriber's traffic rate is reduced, apply twice as much reduction to traffic arriving from transit provider Y than to peering provider W". (Such a policy may require visibility of all traffic for a group of subscribers that share a network capacity restriction, along with where traffic is coming from in terms of transit and peering arrangements.) This policy would not be able to be enforced without this invention.

7. "Raise an alarm if transit provider Y is sending more than 10% of the overall video traffic that is being received by all subscribers, including video sourced within the ISP network". (This may require visibility of total traffic for a group of subscribers along with information about how the traffic was routed via transit or peering providers and analysis of video traffic.) This policy would not be able to be enforced without this invention.

Of the seven exemplary policies set out above, it will be understood that individual ones of the first five could be implemented by having policy equipment either at/near the subscriber access points or at/near the ingestion points, but having policy equipment at/near one such set of points but not at/near the other such set of points would only allow some of the above five to be implemented, but not the others, so would not allow an ISP the freedom to switch dynamically between the five policies, implementing different ones at different times.

This sixth and seventh exemplary policies above are different from the first five in that they each require knowledge of the ingestion point as well as all of the subscriber traffic. Preferred embodiments of the invention allow even policies such as this to be implemented without necessitating the use of (and expense of) DPI or other such monitoring equipment at/near subscriber access points as well as at/near ingestion points.

Policies can be written that take into account one (or a combination of more than one) of the following conditions, for example:

1. How the traffic arrived within the ISP network from a transit or peering provider or internal ISP content source (such as an ISP owned CDN or local ISP turn-around traffic).

2. Traffic characteristics from layer 2 to layer 7 of the OSI stack including IP header information (e.g. source and destination IP address/port), TCP header information, HTTP header information and application payload analysis (e.g. video encoding).

3. Subscriber information such as line rate, technology, product options and contract options (such as monthly volume cap).

4. The volume, rate or pattern of activity of traffic. Volume and peak rate can be measured within a defined period.

5. The time and date. For example policies may be applied during certain peak periods.

6. Network topology and status information. Decisions can be made depending on the network conditions over which the traffic will be delivered.

Policy actions can also vary. As mentioned previously these may be direct actions upon the traffic being analysed, or can be (possibly delayed) actions "out of band" of the traffic, such as raising alerts or producing accounts and billing information. A range of typical "in-band" policy actions include:

1. Blocking traffic
2. Reducing the rate of traffic
3. Re-directing traffic, for example modifying the IP address information of the DNS or HTTP responses.
4. Applying a prioritisation of some traffic, for example by writing DSCP marks or by shaping a range of traffic within a specified rate.
5. Modifying other header of payload information. For example changing the requested video rate.

Any in-band policy action will generally be applied to a target subset of traffic that can be specified using the same parameters as the condition.

Some "out-of-band" policy actions include:
1. Accounting different traffic for the purpose of:
    a. Charging a transit or peering network provider based upon violations of rate and other agreements.
    b. Charging a subscriber (e.g. overage usage charges).
2. Alerts on unusual or non-conformant traffic:
    a. Business traffic on a consumer subscriber line.
    b. Content from a transit provider where other arrangements (e.g. direct peering) exist to take this traffic.
3. Usage analysis for traffic growth/evolution forecasts:
    a. Prediction of traffic required at different transit and peering points based upon growth models that consider the mix of applications and services at each point.
    b. Capacity growth at internal ISP network restriction points.
    c. Analysis of user traffic patterns, segmentation and evolution.

While modern DPI systems are capable of performing many of the actions outlined (in particular the in-band actions on the traffic), they can also be used to output logs and other messages than can be used by other systems to enact the required actions.

Referring to the flow-chart of FIG. 4, the steps of a process according to a preferred embodiment will now be described.

1. Traffic arriving at a network ingestion point of interest to be policy controlled is marked (step s1), for example using one of the technologies described above. Each point that is to have a separate policy applied to it may be uniquely identified by the marking applied. Points that may require enforcement or other policy driven actions may include transit and peering points along with content sources inside the operator network.
2. The traffic flows across the operator network towards the end users such as consumer broadband subscribers
3. The traffic passes through a traffic analysis and policy control point. At this point the traffic is analysed (step s2) to produce a set of attributes that can be used to match policies to the traffic (step s4). These attributes include the ingestion point of the traffic into the operator network. They can also include layer 2-7 traffic properties (depending on the capabilities of the traffic analysis technology) including dynamic traffic volume and rate information as well as subscriber or other network destination/path information and other attributes outline above. The traffic can be analysed in real-time (i.e. by examining per-packet attributes) or (as indicated by step s3) on a historical basis (by looking at volumes of traffic that have certain attributes, for example).
4. Any matching policy is applied (step s5) by taking the specified action upon the specified target. This target can be a set of traffic attributes for traffic control policies. The target for other actions can be an accounting system or administrative user or manager.
5. The potentially modified traffic is allowed to continue to the end subscriber.

Figure 5:
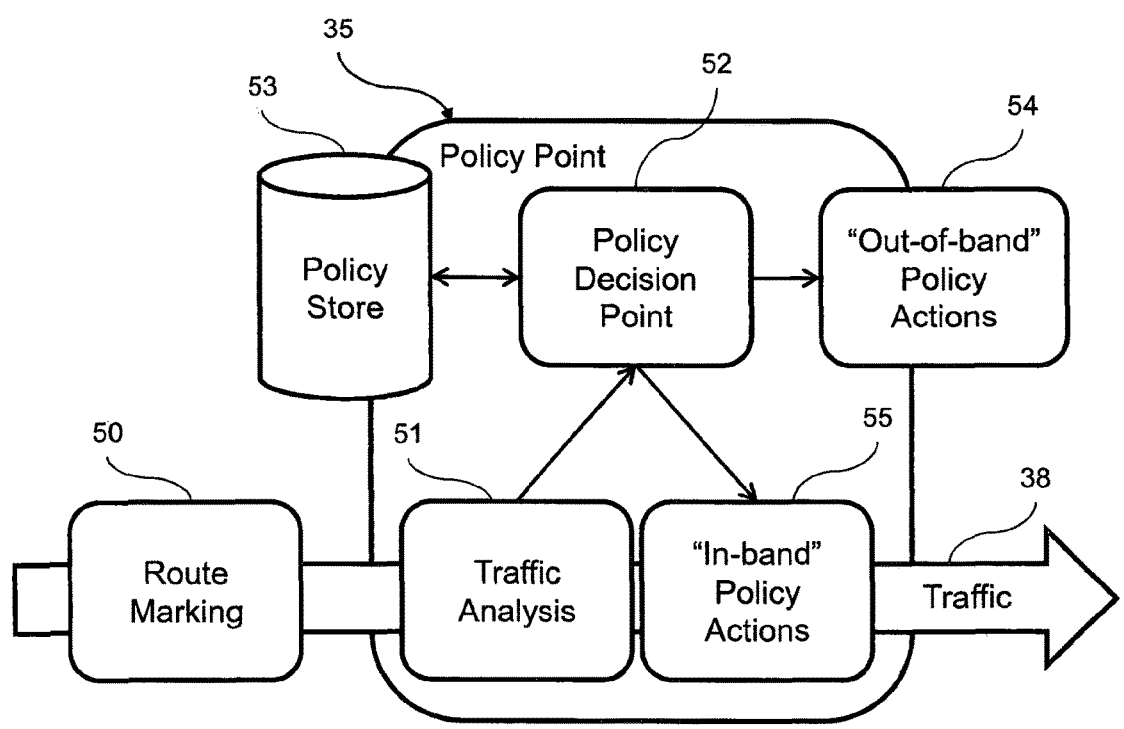
FIG. 5 illustrates the system architecture and functional components that may be used in order to implement a method according to a preferred embodiment.

Such a process may be applied by a system comprising a number of system components such as those shown in FIG. 5, which illustrates the system architecture and functional components that may be used in order to implement a method according to a preferred embodiment. The "route marking" is applied to traffic 38 by a separate physical system 50 at (or near) the traffic ingestion point (e.g. a peering point 12 or a transit point 14 as shown in FIG. 3). In practice the traffic analysis 51, policy decision 52 and "in-band" enforcement 55 will generally be applied within a single in-line system to be able to react and apply policies at a policy point 35 within the latency required for network traffic 38. "Out-of-band" enforcement 54 will generally be applied elsewhere. While a policy store 53 will generally be held locally, a central policy management function is likely to be used to manage policies across multiple policy analysis and enforcement systems.

It should be noted that the policy decision may be deployed in 2 or more levels, where a first policy decision is made to deploy "in band" policies. Since "out-of-band" policies do not typically require immediate action, these can be made by a secondary, policy decision point, for example outside of the DPI system.

Further systems may be required to enact the "out-of-band" actions such as email, network management, accounting, charging or billing systems or usage forecasting and intelligence processes.

The invention claimed is:

1. A method of operating a data network, the data network comprising a plurality of network ingestion points via which data traffic is received from another data network, and a plurality of network attachment points via which data traffic is forwarded, the method comprising:
    receiving data traffic via at least one of the plurality of network ingestion points; and
    forwarding data traffic from said at least one network ingestion point via at least one of said network attachment points;
    in respect of said at least one network ingestion point via which data traffic is received:
        assigning an ingestion point indication in respect of said data traffic received via said network ingestion point, said ingestion point indication being an indication which is indicative of a characteristic of said network ingestion point, said characteristic being a characteristic of said network ingestion point that is shared with one or more others of the plurality of network ingestion points; and
    in respect of data traffic being forwarded via at least one of said network attachment points:
        determining traffic information indicative of a characteristic of the data traffic; and
        selecting a traffic management policy in dependence on said traffic information and in dependence on the characteristic of the network ingestion point via which the data traffic was received,
    wherein the method further comprises applying the selected traffic management policy in respect of data traffic being forwarded via said attachment point.

2. A method according to claim 1, wherein the assigning step comprises assigning one or more indications to data items of which the data traffic is comprised.

3. A method according to claim 1, wherein the ingestion point indication indicates one of the following:
- the identity of the network ingestion point;
- the location in the network of the network ingestion point;
- a categorisation or type of the network ingestion point;
- the identity of another network, or of a sender, from which data traffic is received via said network ingestion point;
- a categorisation or type of other network, or of sender, from which data traffic is received via said network ingestion point.

4. A method according to claim 1, wherein the characteristic shared between said network ingestion point and said one or more other network ingestion points is a categorisation or type of the plurality of network ingestion points.

5. A method according to claim 1, wherein the determining step is performed at a node remote from the network ingestion point via which the data traffic was received.

6. A method according to claim 1, wherein the determining step comprises determining traffic information indicative of a characteristic of the data traffic directly from said data traffic.

7. A method according to claim 1, wherein the determining step comprises inspecting data items of which the data traffic is comprised.

8. A method according to claim 1, wherein the determining step comprises inspection of data at a plurality of levels in the OSI stack.

9. A method according to claim 1, wherein the determining step comprises determining traffic information indicative of a characteristic of the data traffic indirectly from said data traffic.

10. A method according to claim 1, wherein the traffic management policy is selected in dependence also on factors other than traffic information and the characteristic of the network ingestion point via which the data traffic was received.

11. A method according to claim 1, wherein the applying step is performed at one or more nodes remote from the network ingestion point via which the data traffic was received.

12. A method according to claim 1, wherein the applying step is performed at one or more nodes remote from nodes at which the assigning of ingestion point indications has been performed.

13. A method according to claim 1, wherein the step of applying the selected traffic management policy comprises applying in-band sanctions to said data traffic.

14. A method according to claim 1, wherein the step of applying the selected traffic management policy comprises applying out-of-band sanctions in respect of said data traffic.

15. A method according to claim 1, wherein the forwarding via a particular network attachment point of data traffic received via respective network ingestion points comprises forwarding that data traffic in accordance with the traffic management policy selected in respect of that data traffic being when being forwarded via that network attachment point.

16. A method according to claim 1, wherein the selected traffic management policy is applied in respect of data traffic being forwarded via said network attachment point so as to prioritize or de-prioritize the forwarding of the data traffic relative to other data traffic.

17. A method according to claim 1, wherein the selected traffic management policy is applied in respect of data traffic being forwarded via said network attachment point so as to drop, block, delay or re-direct the data traffic.

18. A method according to claim 1, wherein the selected traffic management policy is applied in respect of data traffic being forwarded via said network attachment point so adjust or limit the rate at which data traffic is forwarded via the network attachment point.

19. A method according to claim 1, wherein the selected traffic management policy is applied in respect of data traffic being forwarded via said network attachment point so as to issue an alert in respect of the data traffic.

20. A method according to claim 1, wherein the selected traffic management policy is applied in respect of data traffic being forwarded via said network attachment point so as to update a register in respect of the data traffic, to enable sanctioning actions such as accounting or charging to be applied.

21. Apparatus for operating a data network, the data network comprising a plurality of network ingestion points via which data traffic is received from another data network, and a plurality of network attachment points via which data traffic is forwarded, the apparatus comprising:
- data traffic routing processors operable to receive data traffic via at least one of the plurality of network ingestion points, and to forward data traffic from said at least one network ingestion point via at least one of said network attachment points;
- a plurality of data traffic marking processors each operable in respect of at least one of the plurality of network ingestion points via which data traffic is received, the data traffic marking processor operable in respect of a particular network ingestion point being operable to assign ingestion point indications indicative of a characteristic of that network ingestion point in respect of data traffic received via that network ingestion point, said characteristic being a characteristic of said network ingestion point that is shared with one or more others of the plurality of network ingestion points; and
- one or more policy implementation processors, each operable in respect of data traffic being forwarded via at least one of said network attachment points to perform steps of:
  - determining traffic information indicative of a characteristic of the data traffic; and
  - selecting a traffic management policy in dependence on said traffic information and in dependence on the characteristic of the network ingestion point via which the data traffic was received,
- wherein the apparatus is further configured to apply the selected traffic management policy in respect of data traffic being forwarded via said attachment point.

* * * * *